March 13, 1962 F. W. W. MORLEY 3,024,604

AIRCRAFT JET PROPULSION APPARATUS WITH THRUST REVERSING MEANS

Filed Feb. 27, 1959

United States Patent Office 3,024,604
Patented Mar. 13, 1962

3,024,604

AIRCRAFT JET PROPULSION APPARATUS WITH THRUST REVERSING MEANS

Frederick William Walton Morley, Castle Donington, England, assignor to Rolls-Royce Limited, Derby, England, a British company Filed Feb. 27, 1959, Ser. No. 795,942
Claims priority, application Great Britain Mar. 31, 1958
4 Claims. (Cl. 60—35.54)

This invention comprises improvements in or relating to aircraft jet propulsion apparatus and is concerned more particularly with such apparatus comprising a jet pipe with a propulsion nozzle at its outlet end and means for obtaining reverse thrust, for instance for aircraft braking purposes, which means includes a duct leading from the exhaust gas path and a vaned structure in the duct for assisting to impart to gas flowing in the duct a component of velocity in a direction reverse to the direction of flow in the jet pipe. Such apparatus will be referred to as being of the class specified.

According to the present invention, there is provided an improved vaned structure for aircraft jet propulsion apparatus of the class specified comprising a series of cascades of vanes arranged side by side and mounted in support members separating the cascades, the vanes of each cascade being spaced apart lengthwise of the support members and being staggered lengthwise of the support members with respect to the vanes of at least one adjacent cascade. The vaned structure of this invention has improved strength being capable more readily of withstanding stresses due to temperature changes experienced in use.

Preferably, the vanes of a cascade are staggered with respect to the vanes of each adjacent cascade.

Preferably also, the support members are formed from relatively thin strip so that thermal expansion of the vanes is accommodated by bending of the support members rather than by stressing and bending of the vanes.

Preferably moreover the grid formed by the vanes and support members is supported from the walls of the duct in a manner accommodating relative thermal expansion. For instance the grid may be secured at one side to one wall of the duct and be attached to the opposite wall by means accommodating thermal expansion.

One embodiment of this invention will now be described in which.

Figures 1, 2:
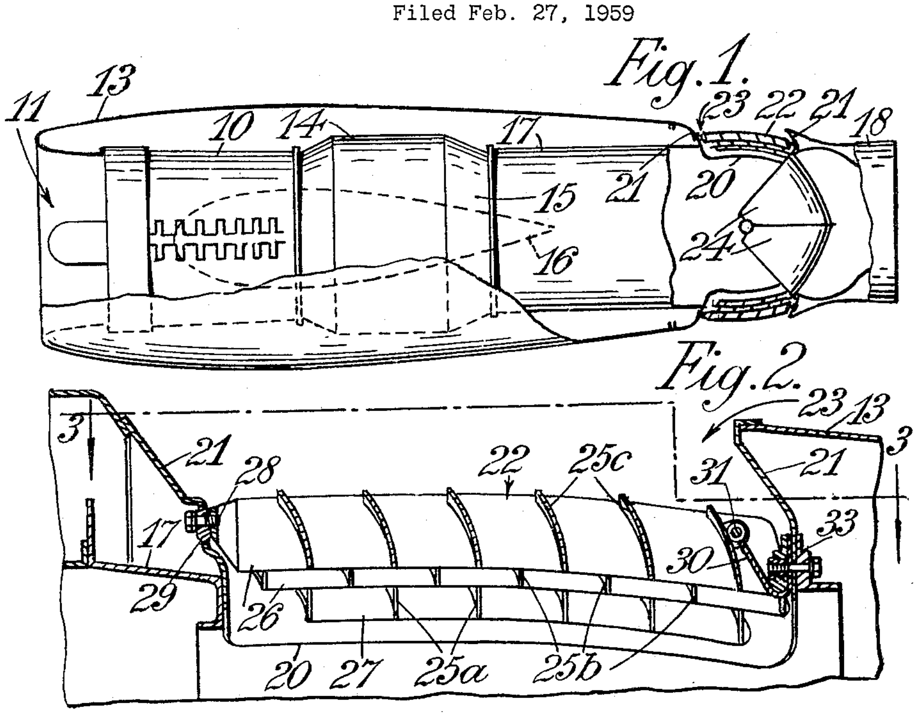
FIGURE 1 shows a gas turbine engine and its exhaust assembly.
FIGURE 2 shows part of the exhaust assembly in more detail.

The engine (FIGURE 1) comprises a compressor 10 receiving air from an intake 11 formed by a nacelle structure 13, combustion equipment 14 receiving compressed air from the compressor 10 and having fuel burnt in it, a turbine 15 receiving the combustion gases from the combustion equipment 14 and an exhaust assembly. The nacelle structure 13 is shown as being at the end of a support strut 16 by which the engine is, for instance, supported below an aircraft wing.

The exhaust assembly comprises a jet pipe 17 leading to a propulsion nozzle 18 shown as one giving noise attenuation, and means by which a reverse thrust may be obtained.

The reverse thrust means comprises openings 20 (FIGURE 2) in the jet pipe 17 leading to ducts which are formed by walls 21 and house vaned structure 22, the ducts leading to outlets 23 in the nacelle structure 13. The reverse thrust means also includes a pair of valve members 24 (FIGURE 1) pivoted about a diameter of the jet pipe 17 to swing between a reverse thrust position as shown in which the openings 20 are uncovered and the jet pipe 17 is blocked downstream of the openings 20, and a normal thrust position in which the valve members 24 close openings 20 and permit exhaust gas to flow rearwardly along the jet pipe 17 to the propulsion nozzle 18. With the valve members 24 in the position shown the exhaust gas flows through the vaned structures 22 which assist to deflect the gas in the forward direction.

Figure 3:
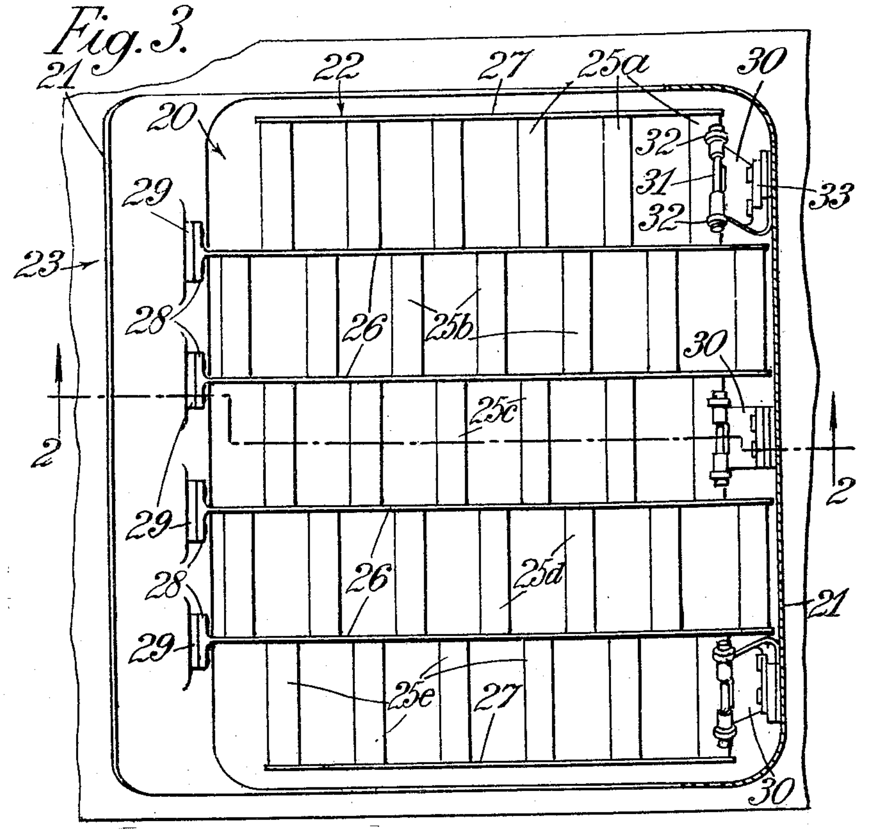
FIGURE 3 is a section on the line 3—3 of FIGURE 2 and shows the section line 2—2 of FIGURE 2.

Each vaned structure 22 comprises (FIGURES 2 and 3) a series of cascades of guide vanes **25*a*, 25*b*, 25*c*, 25*d*, 25*e*, the vanes in a cascade being spaced apart axially of the jet pipe 17** and each vane extending circumferentially of the jet pipe and being concave on its forwardly facing surface.

The cascades of vanes **25*a*—25*e* are arranged side by side being secured to and separated by axially extending support strips 26 and the vanes of each cascade are axially staggered with respect to the vanes of each adjacent cascade. For instance as shown the vanes of cascades 25*a*, 25*c* and 25*e* are aligned with one another and are in line with the spaces between the vanes of cascades 25*b* and 25*d*. The outer ends of the vanes of cascades 25*a* and 25*e* are connected by tie strips 27. The support strips 26 and the tie strips 27 are relatively thin so that they may bend to accommodate lengthwise expansion of the vanes 25*b*, 25*c*, 25*d***.

The vaned structure 22 is supported from the walls 21 so as to accommodate thermal expansion without overstressing of the vaned structure.

Each support strip 26 has a flange 28 at its forward end, which flange is bolted to a seating 29 on the forward wall 21. The rearmost vane of each of the cascades **25*a*, 25*c* and 25*e* has one limb of a V-shaped strap 30 hinged to it by means of a pin 31 engaging bored bushes 32 secured on the rear face of the vane. The other limb of the strap 30 is clamped between a plate 33 and the rear wall 21**.

Thus relative thermal expansion is accommodated by bending of the straps 30.

I claim:

1. An aircraft jet propulsion apparatus comprising a jet pipe with a propulsion nozzle at its outlet end and means for obtaining reverse thrust including a duct leading from the exhaust gas path and a vaned structure in the duct for assisting to impart to the gas flowing in the duct a component of velocity in a direction reverse to the direction of gas flow in the jet pipe, said vaned structure comprising a series of cascades of vanes arranged side by side and mounted in support members separating the cascades, the vanes of each cascade being spaced apart lengthwise of the support members and being staggered lengthwise of the support members with respect to the vanes of each adjacent cascade of vanes.

2. An aircraft jet propulsion apparatus as claimed in claim 1, wherein said vaned structure is secured along one end to a wall of the duct, and a connection joining the opposite end of the duct to the vented structure in a manner permitting relative thermal expansion of the vaned structure and the duct.

3. An air craft jet propulsion apparatus as claimed in claim 2, wherein said means accommodating thermal expansion comprise V-shaped straps each having one limb pivoted to an end vane of an aligned cascade and having its other limb clamped to the said opposite wall.

4. A vaned structure according to claim 1 wherein the support members are formed from relatively thin strip so that thermal expansion of the vanes is accommodated by bending of the support members rather than by stressing and bending of the vanes.

References Cited in the file of this patent

UNITED STATES PATENTS

| | | |
|---|---|---|
| 2,780,058 | Beale et al. | Feb. 5, 1957 |
| 2,846,242 | Drake | Aug. 5, 1958 |

FOREIGN PATENTS

| | | |
|---|---|---|
| 745,065 | Great Britain | Aug. 1, 1956 |